May 28, 1940.　　　J. C. McCORKHILL　　　2,202,742
MOISTURE ABSORBENT
Original Filed June 24, 1936

INVENTOR
JESSE C. McCORKHILL
BY
ATTORNEYS

Patented May 28, 1940

2,202,742

UNITED STATES PATENT OFFICE 2,202,742

MOISTURE ABSORBENT

Jesse C. McCorkhill, Jacksonville, Fla.

Original application June 24, 1936, Serial No. 87,024. Divided and this application November 2, 1937, Serial No. 172,424

3 Claims. (Cl. 252—2.5)

This invention relates to the preservation of moisture absorbent foods and/or other moisture absorbing materials.

It is an object of this invention to provide means of preventing moisture from reaching and damaging moisture absorbent foods, condiments and/or other materials which may deteriorate and/or be damaged by the presence of moisture.

It is a further object of this invention to provide means for preventing the entry of moisture into moisture absorbent packaged materials such as salt, pepper, sugar, coffee and the like by controlling the moisture content in the package adjacent the materials.

It is a further object of this invention to provide such means for preventing the entry of moisture into such materials whereby to avoid the necessity of removing the moisture from the materials.

It is a further object of this invention to provide materials for the accomplishment of the above objects.

It is a further object of this invention to provide a shaker top container for salt, pepper or other materials, which will prevent the clogging or caking of the contents thereof due to moisture.

It is a further object of this invention to provide such a shaker or container which may be easily filled and refilled.

It is a further object of this invention to provide such a shaker or container which will exclude moisture from the contents thereof by means of a suitably located moisture absorbing element which is removable and replaceable and which is inexpensive and substantially non-frangible.

It is a further object of this invention to provide in such a container or shaker an element having extremely high moisture absorbing properties which will not be discolored by contact with moisture or other vapors and which will not discolor or otherwise affect the contents in any way.

It is a further object of this invention to provide a new and useful composition for use as a drying or moisture absorbing means or for the separation of gases or vapors from the air.

It is a further object of this invention to provide a moisture, gas or vapor absorbent material which is stable, which may be formed into an integral, non-frangible element and which is absorptive of moisture, vapor or gas to an extremely high degree.

These and other advantages will appear from the following description taken in connection with the drawing.

This application is a division of my application Serial No. 87,024, filed June 24, 1936.

Figure 1:
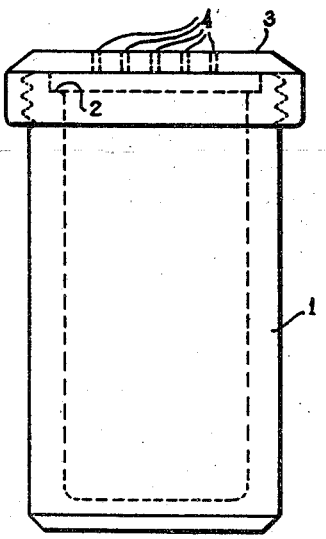
Figure 1 is a side elevational view of a shaker top container suitable for the adaptation of my invention.
Figure 2:
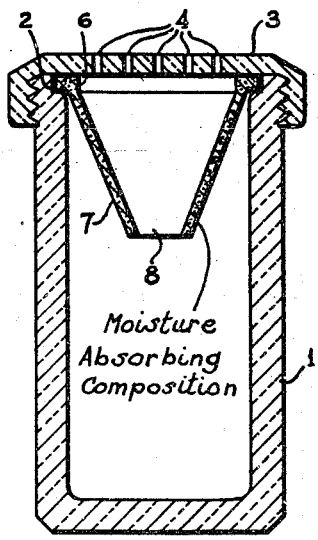
Figure 2 is a side elevational view, in section, of the container of Figure 1, equipped with my invention.
Figure 3:
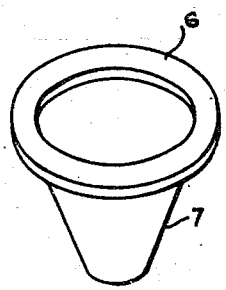
Figure 3 is a view in perspective of the moisture absorbing element, according to my invention, as applied to the container of Figure 2.

Referring to the drawing in detail, the shaker top container, shown in Figures 1 and 2, comprises the cylindrical or other suitably shaped body portion 1 having an internal annular shoulder 2, to which is removably attached by means of screw threads or the like the top 3 which is provided with perforations 4. The annular shoulder 2 is spaced from the under-surface of the top 3 to provide a groove adapted to receive the annular flange 6 of the moisture absorbing element 7 which is substantially funnel-shaped and provided with a constricted opening 8 at the lower end thereof.

Figure 4:
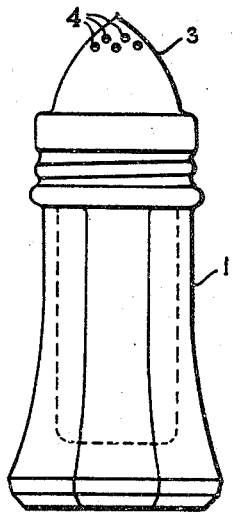
Figure 4 is a side elevational view of a different form of shaker.
Figure 5:
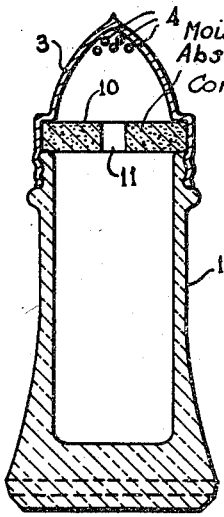
Figure 5 is a side elevational view, in section, of the shaker shown in Figure 4, equipped according to my invention.
Figure 6:
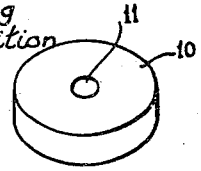
Figure 6 is a perspective view of the moisture absorbing element of my invention, as applied to the structure shown in Figure 5.

With reference particularly to Figures 4, 5 and 6, the body portion 1 of the shaker is of glass or other like material provided at its top outer surface with screw threads which cooperate with like internal threads of the top 3 which is of metal or other suitable material and which is provided with perforations 4. The moisture absorbing element, as shown in Figure 5, is in the form of a flat disk 10 having a centrally arranged aperture 11 therein. It is, of course, to be understood that the shape of the moisture absorbing elements 7 and 10 in the embodiment shown may be of varied shapes and forms and of widely varying dimensions to suit the particular uses for which intended. For instance, if desired, a plurality of perforations 11 may be suitably arranged in the element 10 and the height and other proportions of the funnel-shaped element 7 may be varied, as desired. The purpose of the moisture absorbing elements is to dry or absorb moisture from air having contact with the exposed surfaces of material contained in the shakers. This obviates the hitherto undesirable use of rice or other moisture absorbent materials, which have hitherto been intermingled with the salt, pepper or other materials contained in the shaker top container. In the use of these intermingled absorbent materials, moisture was not excluded from contact with the contained materials but was, to some extent, segregated or attracted to certain areas thereof. I have found that, by preventing access of moisture to the contained material in such a container, the efficiency of the shaker in a moist atmosphere is materially increased over that of the above described method, and that furthermore, in refilling the containers, it is merely necessary to add new salt, pepper or the like without disposing of the remaining salt, pepper or the like in the shaker, due to the fact that this remaining salt, pepper or the like has been unaffected by moisture. Furthermore, the moisture absorbing element may be used over and over again, whereas the material which was intermingled with the salt, pepper or the like had to be disposed of along with the moisture-bearing salt, pepper or the like surrounding this intermingled material.

In addition to this, the appearance of the contained materials such as salt, pepper or the like is unchanged by my moisture absorbing element which itself is not discolored or otherwise affected by moisture. Likewise, the moisture absorbing element is stable and does not disintegrate under the action of moisture or other vapors and thus does not affect the material contained in the shaker.

My moisture absorbing elements may be of varying composition, although a most favorable composition for this use comprises the following formula:

| | Per cent |
|---|---|
| Plaster of Paris (2CaSO₄.H₂O) | 20 to 30 |
| Silica (SiO₂), 300 mesh | 30 to 40 |
| Water (H₂O) | 30 to 50 |

When it is desired to reduce the weight of the moisture absorbing disk or cone without affecting or impairing moisture absorbing properties thereof, I may add to the above materials from 10 to 20% of diatomite or tripolite. The above proportions are taken by weight. The materials are preferably intimately mixed and moulded into the desired shape and may be dried under atmospheric conditions. A further desirable composition comprises a paste-like substance made up of dextrin, silica gel and water in desirable proportions which may be pressed together to the desired form and dried.

It is comprehended within the scope of my invention to provide means for preventing damage to various materials by the absorption of gases and/or vapors produced by the oxidation of various oils and/or oleaginous substances. A particularly desirable application of the principles of my invention is the preservation of packaged coffee. For this and other like purposes, I have found finely ground charcoal an extremely desirable substance for such use and a preferred formula is:

| | Per cent |
|---|---|
| Plaster of Paris | 20 |
| Water | 30 |
| Silica | 40 |
| Charcoal (fine) | 10 | the proportions being taken by weight. The above materials are preferably intimately mixed, moulded and dried.

While the above compositions are particularly adaptable for use with shaker containers of the type described above, it is to be understood that they are also susceptible of use in many widely varying relations for the absorption of vapors, impurities, gases or moisture and that they may be formed into widely varying shapes and sizes, depending upon the particular use for which they are to be adapted. Such articles may be used, for instance, in refrigerators to replace charcoal and other known materials; they are also susceptible of widely varying uses, where it is desired to remove vapor or moisture from the air or other gases.

It is to be understood that the materials may be moulded or otherwise formed into various desired shapes such as balls, bars, bricks, and rings and that the size and shape thereof will depend entirely upon the proposed use.

It will also be understood that the above described structure and composition of matter is merely illustrative of the manner in which my invention may be carried out and that I desire to comprehend within my invention such modifications as come within the scope of the claims and the invention.

Having thus fully described my invention, what I claim as new and desire to secure by Letters Patent, is:

1. A molded article of manufacture for use as a moisture absorbing element, comprising an intimate mixture of 20 to 30% by weight of plaster of Paris, 30 to 40% of silica, of approximately 300 mesh fineness and 30 to 50% by weight of water dried to a hard mass and having a peripheral flange portion, and at least one perforation therethrough for the passage of the substance to be protected from the moisture by said article.

2. A molded article of manufacture for use as a moisture absorbing element, comprising an intimate mixture of 20 to 30% by weight of plaster of Paris, 30 to 40% silica of approximately 300 mesh, 30 to 50% by weight of water and 10 to 20% of diatomite, dried to a hard mass and having a peripheral flange portion, and at least one perforation therethrough for the passage of the substance to be protected from moisture by said article.

3. A molded article of manufacture for use as a moisture absorbing element, comprising an intimate mixture of 20 to 30% by weight of plaster of Paris, 30 to 40% silica of approximately 300 mesh, 30 to 50% by weight of water and 10 to 20% of tripolite, dried to a hard mass and having a peripheral flange portion, and at least one perforation therethrough for the passage of the substance to be protected from moisture by said article.

JESSE C. McCORKHILL.